(12) United States Patent
Hedström

(10) Patent No.: US 7,005,575 B2
(45) Date of Patent: Feb. 28, 2006

(54) DEVICE FOR ARRANGING CABLES IN A JUNCTION BOX

(75) Inventor: Lars Hedström, Ursviken (SE)

(73) Assignee: MT Memoteknik AB, Skellefteå (SE)

( * ) Notice: Subject to any disclaimer, the term of this patent is extended or adjusted under 35 U.S.C. 154(b) by 0 days.

(21) Appl. No.: 10/471,809

(22) PCT Filed: Mar. 14, 2002

(86) PCT No.: PCT/SE02/00480

§ 371 (c)(1),
(2), (4) Date: Apr. 22, 2004

(87) PCT Pub. No.: WO02/080581

PCT Pub. Date: Oct. 10, 2002

(65) Prior Publication Data

US 2004/0168817 A1    Sep. 2, 2004

(30) Foreign Application Priority Data

Mar. 15, 2001   (SE) .................................... 0100940

(51) Int. Cl.
    *H02G 3/08* (2006.01)
(52) U.S. Cl. .................. 174/50; 174/68 C; 174/68; 174/72 A; 174/57; 174/58; 174/DIG. 9; 174/51; 220/3.2; 220/3.7

(58) Field of Classification Search ................. 174/50, 174/68 C, 68, 72 A, 57, 58, DIG. 9, 51; 220/3.2, 220/3.7
See application file for complete search history.

(56) References Cited

U.S. PATENT DOCUMENTS 3,948,473 A * 4/1976 Mason ..................... 248/49
5,175,398 A * 12/1992 Hofmann ................. 174/169
6,218,615 B1 * 4/2001 Canonico ................. 174/50

FOREIGN PATENT DOCUMENTS

GB      1 407 022     9/1975

* cited by examiner

*Primary Examiner*—Dean A. Reichard
*Assistant Examiner*—Anton B. Harris
(74) *Attorney, Agent, or Firm*—Renner, Otto, Boisselle & Sklar, LLP

(57) ABSTRACT

Device for arranging cables in a junction box extractable from a chassis. Between the junction box (1) and the chassis (2) there is a conduit (5) into which the cables (7) are run from the front viewed from the direction in which the box is extracted from the chassis (2), whereby the length of the cable (7) in the chassis (2) is chosen so that the junction box (1) can be drawn out of the chassis (2) for a distance determined in advance.

20 Claims, 3 Drawing Sheets

DEVICE FOR ARRANGING CABLES IN A JUNCTION BOX

This application is a national phase of International Application No. PCT/SE02/00480 filed Mar. 14, 2002 and published in the English language.

The present invention concerns a device for arranging cables as described in the preamble to Claim 1.

With digital distribution frames (DDF) and similar units, the crossover equipment plays an important role for terminal work, testing and maintenance of the unit. As increasingly higher demands are being put on the said crossover equipment with regard to service accessibility, higher demands are also being put on its design.

Our pending Swedish patent no. 0004730-8 describes crossover equipment intended for obtaining points for the measurement and testing of signals in a digital network and which enables the redirection of various traffic routes by connecting together different connectors included in the equipment. Among the advantages obtained with the present crossover module is that it offers good flexibility. Practical testing has, however, shown that since all the cables associated with a crossover module enter the module bunched from the front, the cables are so tightly packed together that they obstruct each other and make it harder if not impossible or at least difficult to pull out the terminal unit from the magazine.

The object of the present invention is to achieve a device that improves service accessibility and solves the aforesaid problem, in particular it is endeavoured to avoid entangling the cables and preventing the terminal box from being pulled out of the chassis.

This object is achieved by the device at the terminal box in accordance with the present invention exhibiting the characteristics specified in the following claims.

Figure 1:
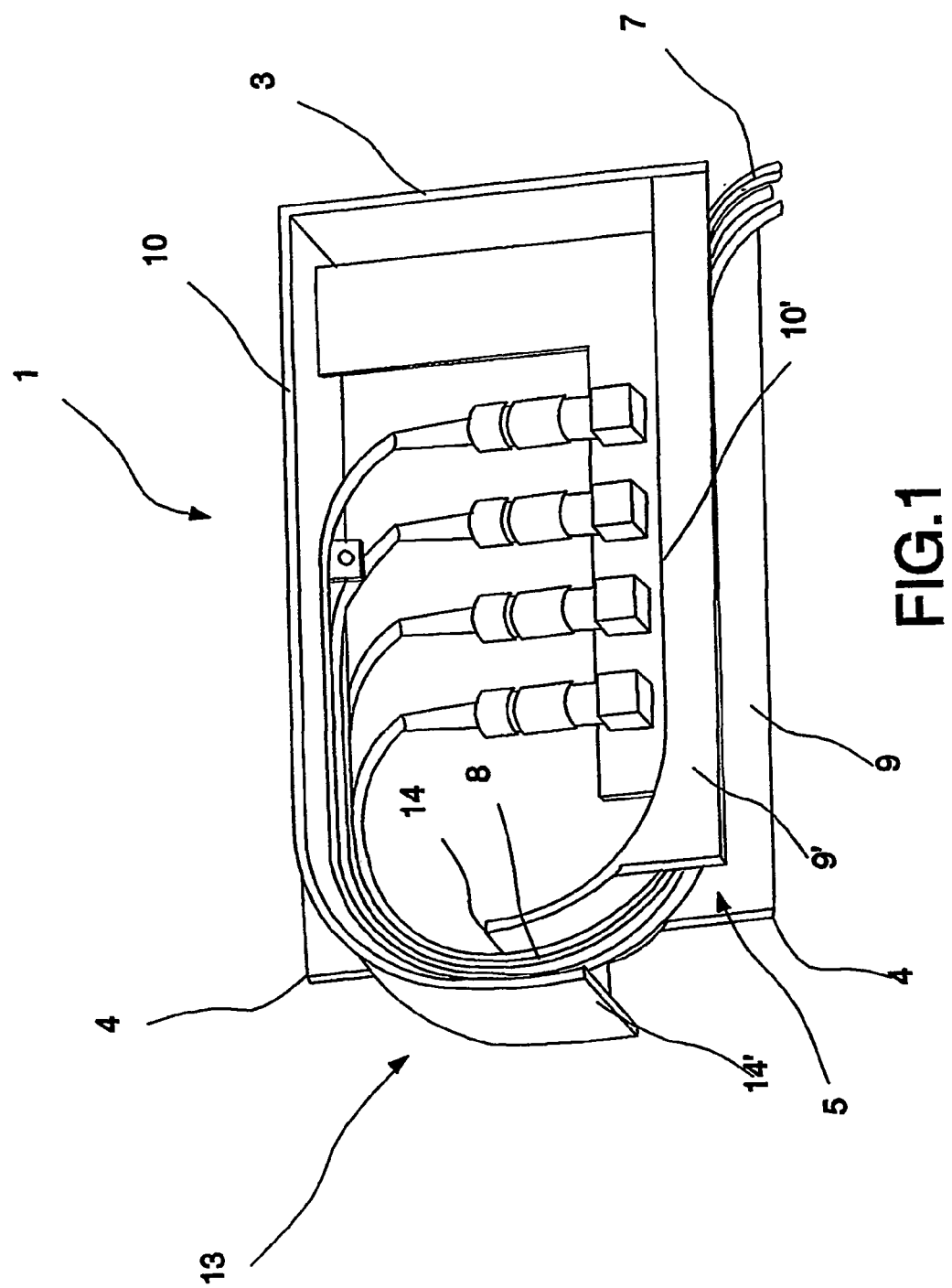
Figure 2:
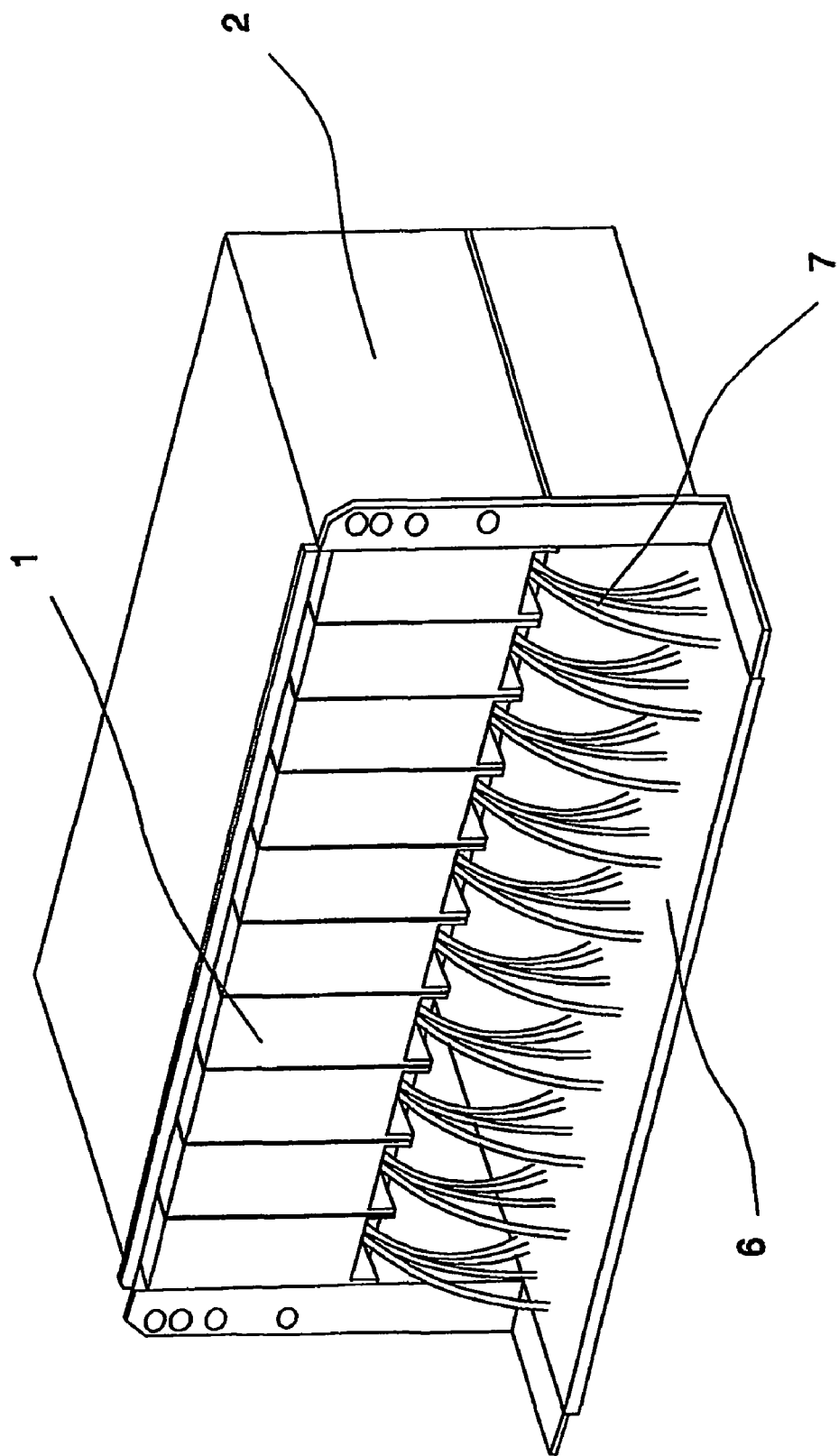
Figure 3:
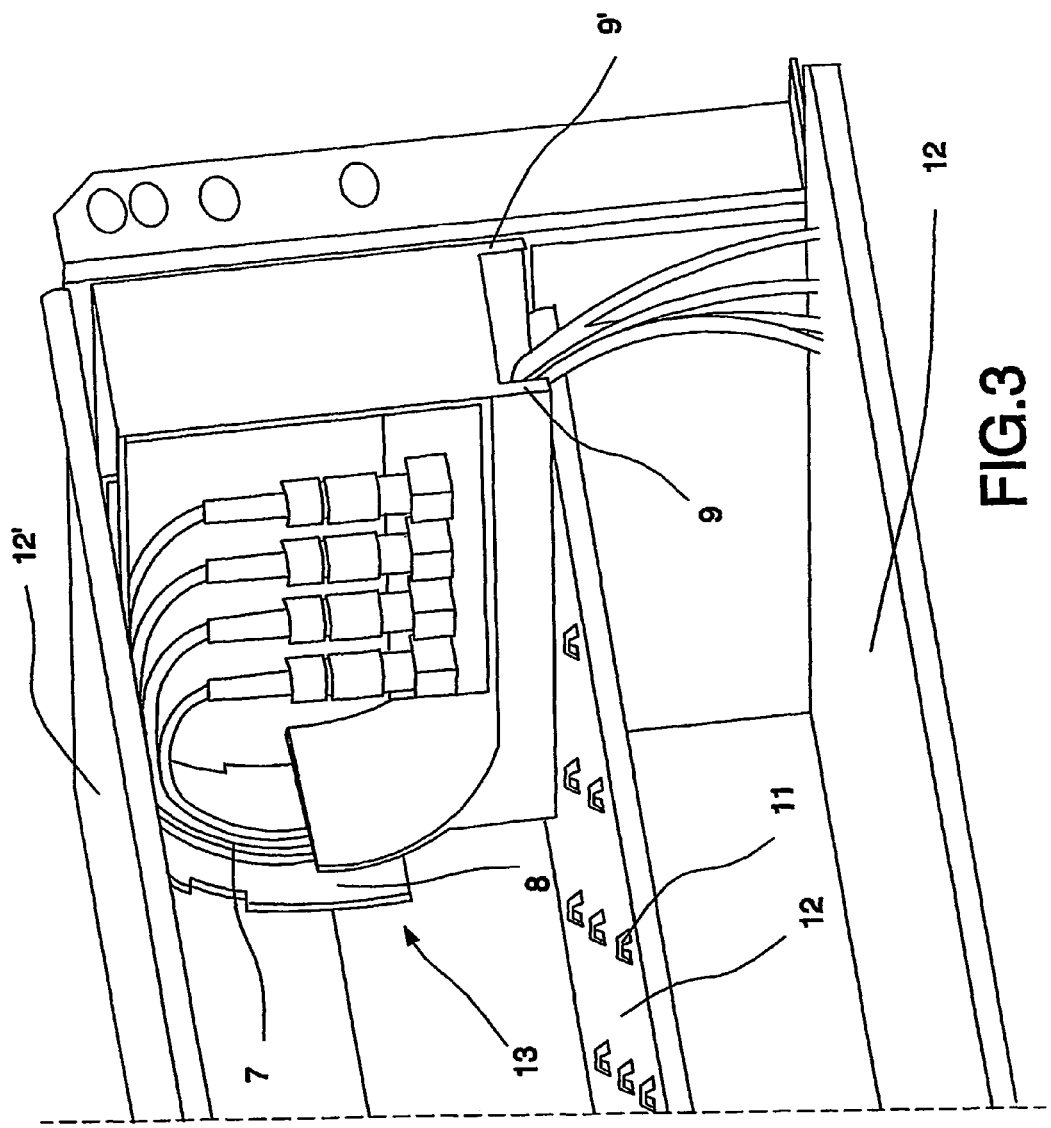

The following is a more detailed description of this invention with references to attached drawing, where FIG. 1 is a perspective view of a terminal box in accordance with the invention, FIG. 2 exhibits a number of terminal boxes mounted in a chassis, and FIG. 3 exhibits a detailed view of a terminal box mounted in a chassis.

The terminal box is generally designated 1. A box of this kind normally forms a junction point for two telecommunication units in a network in which several such units contained in a chassis 2 together form a complete crossover unit for several interlinked networks. The terminal box 1 is designed as a relatively narrow of flat unit in order to allow several such units standing on edge to be placed in rows and side by side in the chassis 2. A printed circuit board, for example, can be arranged in the junction box, to which cables are run inside the junction box from the front. In order to facilitate extracting the junction box from the chassis, there is a device for arranging the cables.

This device principally exhibits the form of an essentially rectangular unit containing a frame 3 that at its upper and lower edges exhibits means of holding and arranging 4 from which is formed a conduit 5 between the junction box 1 and the chassis 2 intended to arrange the cables. The chassis 2 includes a means of support in the form of a channel 6 situated at the bottom of its front edge and in which channel the cables 7 rest. From the channel 6 the cables extend into the conduit 5 and into an opening 8 arranged at the back of the junction box.

The means of holding and arranging constitutes a protrusion 9,9' extending from an upper and lower frame piece 10,10' in the frame interacting with notches 11 arranged in the chassis 2 in the form of punched folds on the inside of the chassis 2 bottom 12 and its top piece 12'. As shown in FIG. 1, the protrusion 9,9' forms an open conduit 5 whereby the lower frame piece 10' constitutes the upper boundary of the conduit 5. The rear extension of the frame pieces 10,10' to the chassis 2 exhibits a passage 13 formed by two bent lugs 14,14', between which an opening 8 is bounded. The conduit 5 is used to gather and arrange the cables 7 running to the opening 8. The length of the cables is adjusted so that the junction box can be drawn out of the chassis for a distance determined in advance. The passage 13 is intended to facilitate sliding the junction box 1 in and out of the chassis 2 without the cables hindering the extraction of the junction box from the chassis 2.

The present invention is not limited to the above description and as illustrated in the drawings but can be changed and modified in a number of different ways within the framework of the idea of invention specified in the following claims.

What is claimed is:

1. A device for arranging cables in a junction box that can be drawn out of a chassis from an inserted position in the chassis, the cables being connected between the junction box and chassis, and the junction box when in said inserted position forming with the chassis a conduit that is open to a front end of the chassis from which the cables extend viewed from the direction the box is drawn out of the chassis and in which the cables, going from its end connected to the chassis to its end connected to the junction box, enter from the front viewed from the direction the box is drawn out of the chassis and exit from the rear, whereby the cables are received in a channel in the chassis and arranged in a loop with a length so selected that the junction box can be drawn out of the chassis for a distance determined in advance.

2. A device according to claim 1, characterized in that the junction box contains a frame and that interacting means of holding and arranging are arranged between the inside of the frame and the chassis, whereby a conduit forms part of at least one of the said means of holding and arranging.

3. A device in accordance with claim 2, characterized in that the means of holding and arranging contain protrusions on the frame that interact with the notches made in the chassis.

4. A device in accordance with claim 3, characterized in that the conduit is defined between two protrusions located at a distance from and extended parallel with each other.

5. A device in accordance with claim 2, characterized in that the frame of the junction box contains an opening through which the cables run and that to the said opening is arranged a passage for arranging the cables in the opening.

6. A device according to claim 5, characterized in that the passage contains two bent lugs that between them bound a gap communicating with the opening through which the cables are run.

7. A device according to claim 2, characterized in that the frame contains an upper and a lower frame piece on which the means of arranging is situated, whereby the lugs are formed as extensions of the said frame pieces extending backwards towards the chassis.

8. A device according to claim 1, characterized in that the junction box contains electrical equipment in the form of a printed circuit board or similar to which the cables are connected.

9. A device in accordance with claim 3, characterized in that the frame of the junction box contains an opening through which the cables run and that to the said opening is arranged a passage for arranging the cables in the opening.

10. A device according to claim 9, characterized in that the passage contains two bent lugs that between them bound a gap communicating with the opening through which the cables are run.

11. A device according to claim 10, characterized in that the frame contains an upper and a lower frame piece on which the means of arranging is situated, whereby the lugs are formed as extensions of the said frame pieces extending backwards towards the chassis.

12. A device in accordance with claim 1, characterized in that the junction box includes a frame and the cables exit the frame at the rear thereof.

13. A device according to claim 12, characterized in that the passage contains two bent lugs that between them bound a gap communicating with the opening through which the cables are run.

14. A device according to claim 13, characterized in that the frame contains an upper and a lower frame piece on which the means of arranging is situated, whereby the lugs are formed as extensions of the said frame pieces extending backwards towards the chassis.

15. A device according to claim 2, characterized in that the junction box contains electrical equipment in the form of a printed circuit board or similar to which the cables are connected.

16. A device according to claim 3, characterized in that the junction box contains electrical equipment in the form of a printed circuit board or similar to which the cables are connected.

17. A device according to claim 4, characterized in that the junction box contains electrical equipment in the form of a printed circuit board or similar to which the cables are connected.

18. A device according to claim 5, characterized in that the junction box contains electrical equipment in the form of a printed circuit board or similar to which the cables are connected.

19. A device according to claim 6, characterized in that the junction box contains electrical equipment in the form of a printed circuit board or similar to which the cables are connected.

20. A device according to claim 7, characterized in that the junction box contains electrical equipment in the form of a printed circuit board or similar to which the cables are connected.

* * * * *